(12) United States Patent
Nakatsu et al.

(10) Patent No.: US 6,834,742 B2
(45) Date of Patent: Dec. 28, 2004

(54) VEHICLE STEERING APPARATUS

(75) Inventors: Masatoshi Nakatsu, Susono (JP); Junji Kawamuro, Susono (JP); Takahiro Kojo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/615,018

(22) Filed: Jul. 9, 2003

(65) Prior Publication Data

US 2004/0021284 A1 Feb. 5, 2004

(30) Foreign Application Priority Data

Jul. 30, 2002 (JP) ....................................... 2002-221651

(51) Int. Cl.[7] ................................................ B62D 5/04
(52) U.S. Cl. .................... 180/444; 180/446; 74/388 PS
(58) Field of Search ......................... 180/402, 443–446, 180/400; 280/93.513, 93.514; 74/388 PS

(56) References Cited

U.S. PATENT DOCUMENTS

| 4,715,461 A | * | 12/1987 | Shimizu | 180/446 |
|---|---|---|---|---|
| 4,940,105 A | * | 7/1990 | Matsunaga et al. | 180/404 |
| 5,423,391 A | * | 6/1995 | Shimizu | 180/446 |
| 6,164,150 A | * | 12/2000 | Shindo et al. | 74/388 PS |
| 6,179,083 B1 | * | 1/2001 | Yamauchi | 180/444 |
| 6,354,396 B1 | * | 3/2002 | Horton et al. | 180/446 |
| 6,470,993 B1 | * | 10/2002 | Matsuda et al. | 180/444 |
| 6,705,424 B2 | * | 3/2004 | Ogawa et al. | 180/446 |
| 2004/0016591 A1 | * | 1/2004 | Kojo et al. | 180/443 |

FOREIGN PATENT DOCUMENTS

| JP | A-11-034894 | 2/1999 |
|---|---|---|
| JP | A-2001-48032 | 2/2001 |

* cited by examiner

*Primary Examiner*—Avraham Lerner
(74) *Attorney, Agent, or Firm*—Oliff & Berridge, PLC

(57) ABSTRACT

A vehicle steering apparatus includes a variable gear ratio mechanism which is provided in a steering force transmitting system, and a lock mechanism which restricts relative rotation of an input shaft and an output shaft of the transmitting ratio changing mechanism. The lock mechanism is engaged by inserting a lock arm in a indented portion of a lock holder of the lock mechanism. A play angle when the lock mechanism is engaged by inserting the lock arm in the indented portion is set to be smaller than a rotational angle of a motor which is required for outputting six different signals.

11 Claims, 8 Drawing Sheets

FIG. 4

| DETECTING PORTION OUTPUT PATTERN | 1 | 2 | 3 | 4 | 5 | 6 | 1 | 2 | ... |
|---|---|---|---|---|---|---|---|---|---|
| OUTPUT OF SENSOR 26a | H | L | L | L | H | H | H | L | ... |
| OUTPUT OF SENSOR 26b | H | H | L | L | L | H | H | H | ... |
| OUTPUT OF SENSOR 26c | H | H | H | L | L | L | H | H | ... |

VEHICLE STEERING APPARATUS

INCORPORATION BY REFERENCE

The disclosure of Japanese Patent Application No. 2002-221651 filed on Jul. 30, 2002, including the specification, drawings and abstract is incorporated herein by reference in its entirety.

BACKGROUND OF THE INVENTION

1. Field of the Invention

The invention relates to a vehicle steering apparatus with a lock mechanism.

2. Description of the Related Art

A vehicle steering apparatus with a lock mechanism is known, which includes a variable gear ratio mechanism that changes a turning amount of a turning wheel with respect to a steering amount of a steering wheel, and is provided on a steering shaft connected to a steering wheel; and a lock mechanism which restricts relative rotation of an input shaft and an output shaft of the variable gear ratio mechanism. An example of such a vehicle steering apparatus with a lock mechanism is disclosed in Japanese Patent Laid-Open Publication No. 2001-48032. The lock mechanism includes a lock holder which is provided on a rotor side of a motor mounted in the variable gear ratio mechanism; and a lock arm which is provided on a stator side of the motor. The lock mechanism is engaged by engaging the lock arm with a indented portion formed in a peripheral surface of the lock holder.

In this apparatus, if an opening width of the indented portion of the lock holder is small, there is a possibility that the lock mechanism cannot be engaged. For example, in the case where the lock mechanism is to be engaged when the motor is rotating, if the indented portion is not at a position at which the lock arm is engaged, the lock mechanism is not engaged appropriately.

In order to solve the problem, it is conceivable to make the opening width of the indented portion large. However, if the indented portion is made wide, there is large play between the lock arm and the lock holder when the lock mechanism is engaged. As a result, it is not possible to detect a positional relation between the lock holder and the lock arm accurately, and accordingly, it is not possible to control steering appropriately. For example, in the case where the lock mechanism is engaged while a vehicle is stopped, and then the lock mechanism is disengaged so as to start the vehicle, the rotational position of the rotating shaft of the motor at the time of vehicle start may be displaced from the rotational position thereof at the time of vehicle stop. In such a case, there is a possibility that the rotational position of the rotating shaft cannot be determined, which makes it difficult to control steering appropriately.

SUMMARY OF THE INVENTION

It is an object of the invention to provide a vehicle steering apparatus which can control steering appropriately.

A first aspect of the invention relates to a vehicle steering apparatus which includes a variable gear ratio device, a rotation detecting device, and a lock mechanism. The variable gear ratio device includes an input shaft connected to a steering wheel side and an output shaft connected to a turning wheel side, and changes a ratio between a steering angle input to the input shaft and a rotational angle output to the output shaft using rotation of a motor. The rotation detecting device repeatedly outputs, as the motor rotates, a series of a predetermined number of different signals, the signals differing according to the rotation of the motor, so as to detect a rotational position of a rotating shaft of the motor. The lock mechanism includes a lock holder which rotates together with the rotating shaft of the motor, and in which plural indented portions are formed at an outer periphery portion thereof, and an engagement member which is fitted on a stator side of the motor. The lock mechanism restricts relative rotation of the input shaft and the output shaft by inserting the engagement member in one of the indented portions. A play angle between the engagement member and the indented portion when the engagement member is inserted in the indented portion is smaller than a first rotational angle of the motor which is required for outputting all of the predetermined number of different signals.

According to the vehicle steering apparatus, the play angle when the lock mechanism is engaged by inserting the engagement member in the indented portion is smaller than the first rotational angle of the motor which is required for outputting all of the predetermined number of signals. Therefore, the rotation detecting device can be prevented from outputting the same signal at different rotational positions even if the motor rotates due to the play between the engagement member and the indented portion when the lock mechanism is engaged. Accordingly, the rotational position of the rotating shaft of the motor can be detected based on the output of the rotation detecting device, which makes it possible to control steering appropriately.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4 is a diagram describing output patterns detected by the steering angle sensor in the vehicle steering apparatus shown in FIG. 1;

DETAILED DESCRIPTION OF THE PREFERRED EMBODIMENTS

Figure 1:
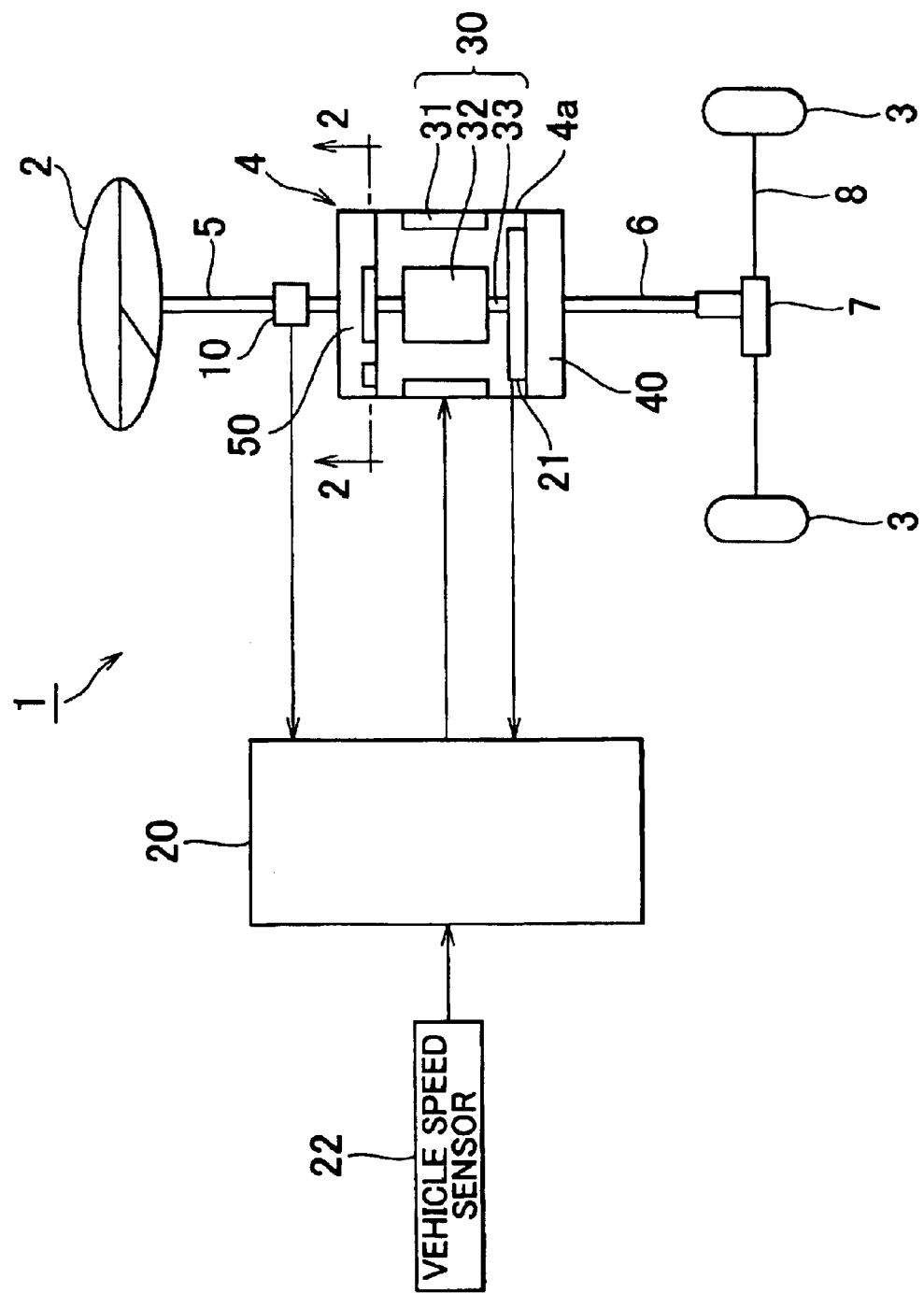
FIG. 1 is a diagram showing a configuration of a vehicle steering apparatus according to an embodiment of the invention.

Hereinafter, embodiments of the invention will be described with reference to the accompanying drawings. In the description of the drawings, the same elements are denoted by the same reference numerals, and duplicate description thereof will be omitted.

FIG. 1 is a schematic diagram showing a configuration of a vehicle steering apparatus according to a first embodiment of the invention.

As shown in FIG. 1, in a vehicle steering apparatus 1, a variable gear ratio mechanism 4 is provided in a steering force transmitting system which transmits a steering force of a steering wheel 2 to turning wheels 3. The variable gear ratio mechanism 4 changes a steering ratio between a steering angle of the steering wheel 2 and a turning angle of the turning wheels 3. An input shaft 5 of the variable gear ratio mechanism 4 is connected to the steering wheel 2. An output shaft 6 of the variable gear ratio mechanism 4 is connected to the turning wheels 3 via a gear device 7 composed of a rack and pinion, and the like. The gear device 7 moves a tie rod 8 so as to turn the turning wheels 3 by receiving the rotation of the output shaft 6.

A steering angle sensor 10 is provided on the input shaft 5. The steering angle sensor 10 functions as steering angle detecting means for detecting the steering angle of the steering wheel 2 based on a rotational state of the input shaft 5.

A motor 30, a reducer 40, and a lock mechanism 50 are housed in the variable gear ratio mechanism 4. The motor 30 is driven by receiving a drive control signal from a steering controller 20. A stator 31 of the motor 30 is fitted to a housing 4a of the variable gear ratio mechanism 4. A rotor 32 of the motor 30 is connected to the output shaft 6 via the reducer 40. The reducer 40 is reducing means which reduces the rotational angle of the motor 30 input thereto so as to output a rotational angle to the output shaft 6. Output angle of the reducer 40 is transmitted to the output shaft 6. Also, a steering force is transmitted to the output shaft 6 via the housing 4a. As the reducer 40, for example, a planetary gear mechanism is employed.

Also, a rotation sensor 21 is provided in the variable gear ratio mechanism 4. The rotation sensor 21 functions as rotation detecting means for detecting a rotational position of a rotating shaft 33 of the motor 30.

The steering controller 20 receives detection signals from the steering angle sensor 10 and the rotation sensor 21. The steering controller 20 controls the entire vehicle steering apparatus 1. For example, the steering controller 20 is composed of a CPU, ROM, RAM, an input signal circuit, an output signal circuit, a power source circuit, and the like. Also, the steering controller 20 receives a detection signal from a vehicle speed sensor 22 mounted in a vehicle. Based on the detection signals from the steering angle sensor 10, the vehicle speed sensor 22, and the like, the steering controller 20 outputs a driving signal to the variable gear ratio mechanism 4 so as to adjust the steering ratio, thereby controlling steering.

Figure 2:
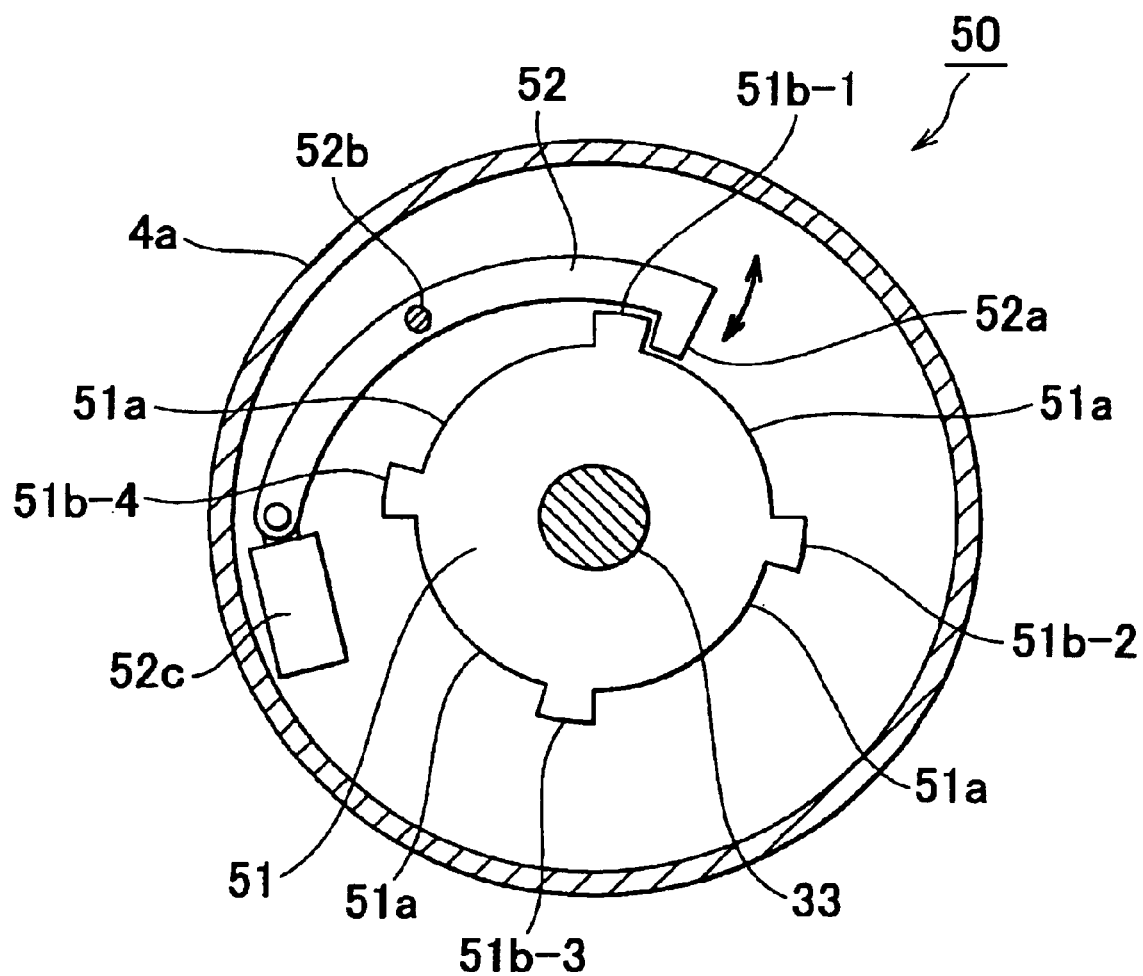
FIG. 2 is a diagram describing a lock mechanism in the vehicle steering apparatus shown in FIG. 1.

FIG. 2 is a cross sectional view of the lock mechanism 50.

The lock mechanism 50 shown in FIG. 2 restricts relative rotation of the input shaft 5 and the output shaft 6 of the variable gear ratio mechanism 4. The lock mechanism 50 includes a lock holder 51 and a lock arm 52, as shown in FIG. 2. The lock holder 51 is fitted on the rotor 32 side of the motor 30.

For example, the lock holder 51 is fitted on the rotating shaft 33 of the motor 30, and rotates due to the rotation of the rotor 32. It is preferable not to completely fix the lock holder 51 on the rotating shaft 33 so that the lock holder 51 can rotate with respect to the rotating shaft 33 when torque that is equal to or larger than a predetermined value is applied to the lock holder 51. When the lock holder 51 is fitted on the rotating shaft 33 in this manner, the portion where the lock holder 51 is fixed to the rotating shaft 33 can function as a torque limiter, and the lock holder 51, the lock arm 52, and other components can be prevented from being damaged even if torque that is equal to or larger than a predetermined value is applied to the lock holder 51 when the lock mechanism is engaged.

The outer periphery of the lock holder 51 is formed by a plurality of indented portions 51a and protruding portions 51b-1 to 51b-4 (four each in this exemplary embodiment). The four indented portions 51a are formed all having the same shape (width and depth) and equidistant from one another. The four protruding portions 51b-1 to 51b-4, which protrude from the indented portions 51a are also all formed having the same shape (width and height) and equidistant from each other.

The lock arm 52, which is an engagement member, is configured so as to be capable of moving close to, and moving away from the lock holder 51. Since the lock arm 52 can move close to the lock holder 51, the lock arm 52 can be engaged with one of the indented portions 51a of the lock holder 51. The lock arm 52 is fitted on the stator 31 side of the motor 30. In this embodiment, the lock arm 52 is fitted to the housing 4a where the stator 31 is fitted.

A hook-shaped engaging portion 52a is formed at a tip of the lock arm 52. A pin 52b is provided at an intermediate position in the lock arm 52. The lock arm can pivot about the pin 52b. Also, a solenoid 52c is fitted to the lock arm 52 at a base end on a side opposite to the engaging portion 52a. When the solenoid 52c is operated, the base end of the lock arm 52 is moved such that the lock arm 52 is pivoted. Thus, the engaging portion 52a is inserted in one of the indented portions 51a such that lock arm 52 is engaged with the lock holder 51, which brings the lock mechanism 50 into an engaged state.

Figure 3:
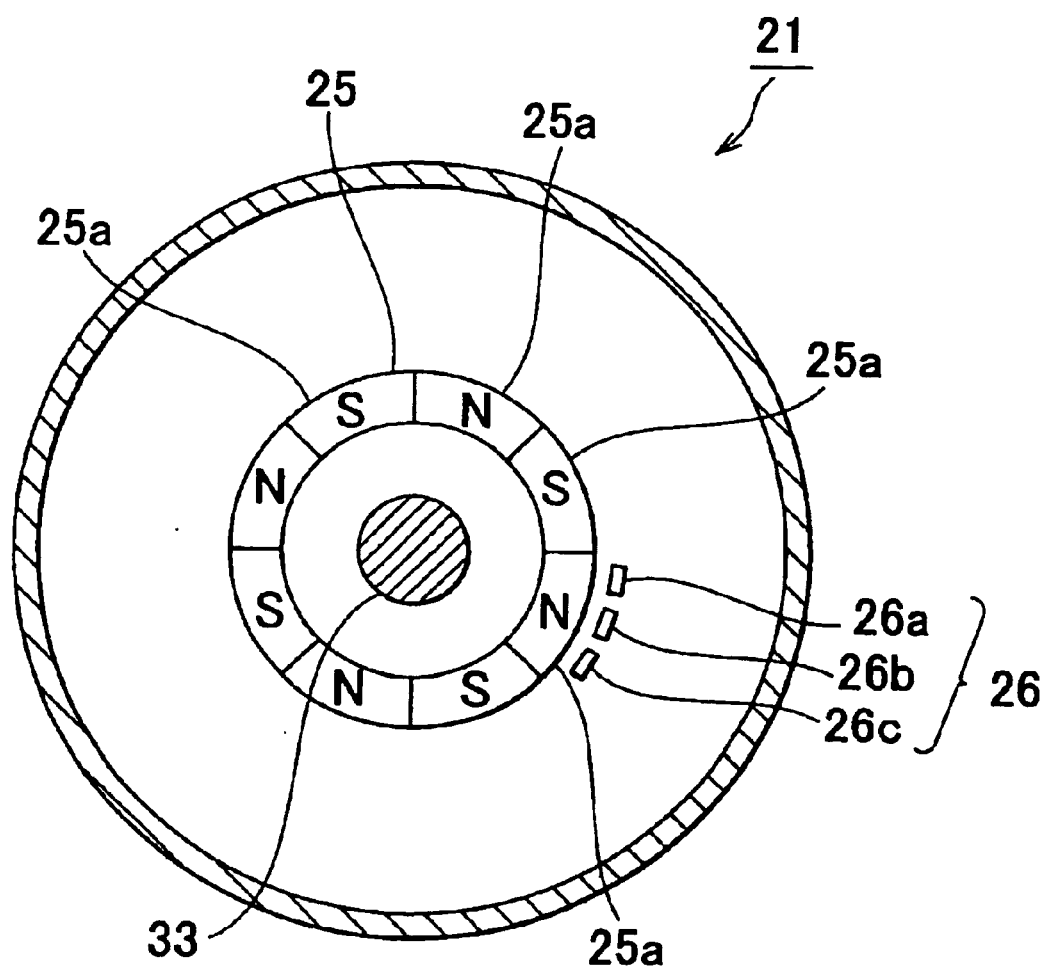
FIG. 3 is a diagram describing a steering angle sensor in the vehicle steering apparatus shown in FIG. 1.

FIG. 3 is a schematic diagram showing a configuration of the rotation sensor 21.

As shown in FIG. 3, the rotation sensor 21 includes a rotor portion 25 which integrally rotates with the rotating shaft 33 of the motor 30, and a detecting portion 26 which is provided along an outer periphery of the rotor portion 25. The rotor portion 25 has a ring shape, and is fitted around the rotating shaft 33 so as to integrally rotate with the rotating shaft 33. For example, magnets may be arranged such that eight magnetic poles 25a of the magnets are provided in the circumferential direction in the rotor portion 25. The rotor portion 25 of the rotation sensor 21 and the lock holder 51 of the lock mechanism 50 integrally rotate via the rotating shaft 33, and normally do not rotate with respect to each other.

The magnetic poles 25a are provided such that different magnetic fields, for example, magnetic fields in different directions, are alternately created toward the detecting portion 26 when the rotor portion 25 rotates. Thus, when the rotor portion 25 rotates together with the rotating shaft 33, the magnetic fields around the detecting portion 26 change. If eight magnetic poles 25a constitute the rotor portion 25, the cycle of change in the magnetic fields is the rotation angle 90 degrees.

The detecting portion 26 detects the rotational position of the rotating shaft 33 based on the change in the magnetic fields. For example, the detecting portion includes three magnetic sensors 26a to 26c. The magnetic sensors 26a to 26c are provided in the circumferential direction of the rotor portion 25. Each of the magnetic sensors 26a to 26c is connected to the steering controller 20 (refer to FIG. 1). The magnetic sensors 26a to 26c are arranged along the periphery of the rotor portion 11 such that the interval between the centers of adjacent magnetic sensors (e.g., 26a, 26b) is equivalent to one third of an outer periphery portion of one magnetic pole 25a.

Therefore, the rotor portion 25 rotates by an angle equivalent to a third of the width of the magnetic pole 25a, an output of the detecting portion 26 changes. Accordingly, each time the rotating shaft 33 rotates by 15 degrees (i.e., 360/(8×3) degrees), the output of the detecting portion 26 changes, which makes it possible for the rotation sensor 21 to detect the rotational angle (the rotational position) of the rotating shaft 33 with a resolution of 15 degrees.

FIG. 4 is a diagram specifically showing detection signals of the rotation sensor 21.

As shown in FIG. 4, the rotation sensor 21 sequentially outputs the detection signals in a predetermined number of different output patterns, for example, six different output patterns in a repeated manner. In FIG. 3, when one magnetic pole 25a faces all of the magnetic sensors 26a to 26c, all of the outputs from the magnetic sensors 26a to 26c are the same, for example, HIGH (an output pattern 1, in FIG. 4). When the rotor portion 25 rotates in a clockwise direction, an adjacent magnetic pole 25a moves near to the sensor 26a. Therefore, only the output of the sensor 26a becomes LOW (an output pattern 2). When the rotor portion 25 rotates further, the outputs from the sensor 26b and the sensor 26c sequentially become LOW (output patterns 3 and 4 respectively).

When the rotor portion 25 rotates further, the outputs from the magnetic sensors 26a to 26c change, and the output pattern of the detecting portion 26 changes to an output pattern 5, and then to an output pattern 6 in FIG. 4. When the rotor portion 25 rotates further, the output pattern of the detecting portion 26 returns to the output pattern 1, and then, changes to the output patterns 2, 3 and the like in a sequential manner.

The cycle in which the output pattern changes from the output pattern 1 to the output pattern 6 depends on a state where the magnetic poles 25a of the rotor portion 25 are provided. When two magnetic poles 25a, i.e., a south pole and a north pole are arranged such that together they occupy a region of the circumference of the rotor portion 25 which corresponds to 90 degrees of that entire circumference, as shown in FIG. 3, the change in the output pattern of the detecting portion 26 is one cycle for every 90 degrees of rotation of the rotor portion 25. That is, the detecting portion 26 outputs the series of the predetermined number of different signals a plurality of times while the motor 30 rotates 360 degrees. In this embodiment, the detecting portion 26 outputs the output pattern 1 to the output pattern 6 four times while the motor 30 rotates 360 degrees.

Next, fitting of the lock mechanism 50 will be described.

As shown in FIG. 2, the lock mechanism 50 is fitted with the lock arm 52 being inserted in one of the indented portions 51a of the lock holder 51. After fitted, the data with respect to the positional relation between the lock holder 51 and the lock arm 52 is initialized, and it is determined which of the protruding portions, from among the protruding portions 51b-1, 51b-2, 51b-3 and 51b-4, the lock arm 52 is positioned between, or which of the four indented portions 51a the lock arm 52 is placed in. The steering controller 20 stores determined position of the lock arm 52.

After the initialization, the rotation sensor 21 constantly monitors the rotational position of the rotating shaft 33 during control. For example, the steering controller 20 stores the rotational angle by which the rotating shaft 33 rotates in the clockwise direction or in the counterclockwise direction. Thus, when the lock arm 52 enters one of the indented portions 51a, it can be detected which of the four indented portions 51a the lock arm 52 is placed in.

As described above, it is determined which of the four indented portions 51a the lock arm 52 is placed in when the control starts. In addition, it is determined which of the four indented portions 51a the lock arm 52 is placed in based on the sensor signal when the control finishes. Therefore, the rotational position of the rotating shaft 33 when the control is restarted can be determined. Thus, control continuity and accuracy of the vehicle steering apparatus can be maintained at a high level.

Figure 5:
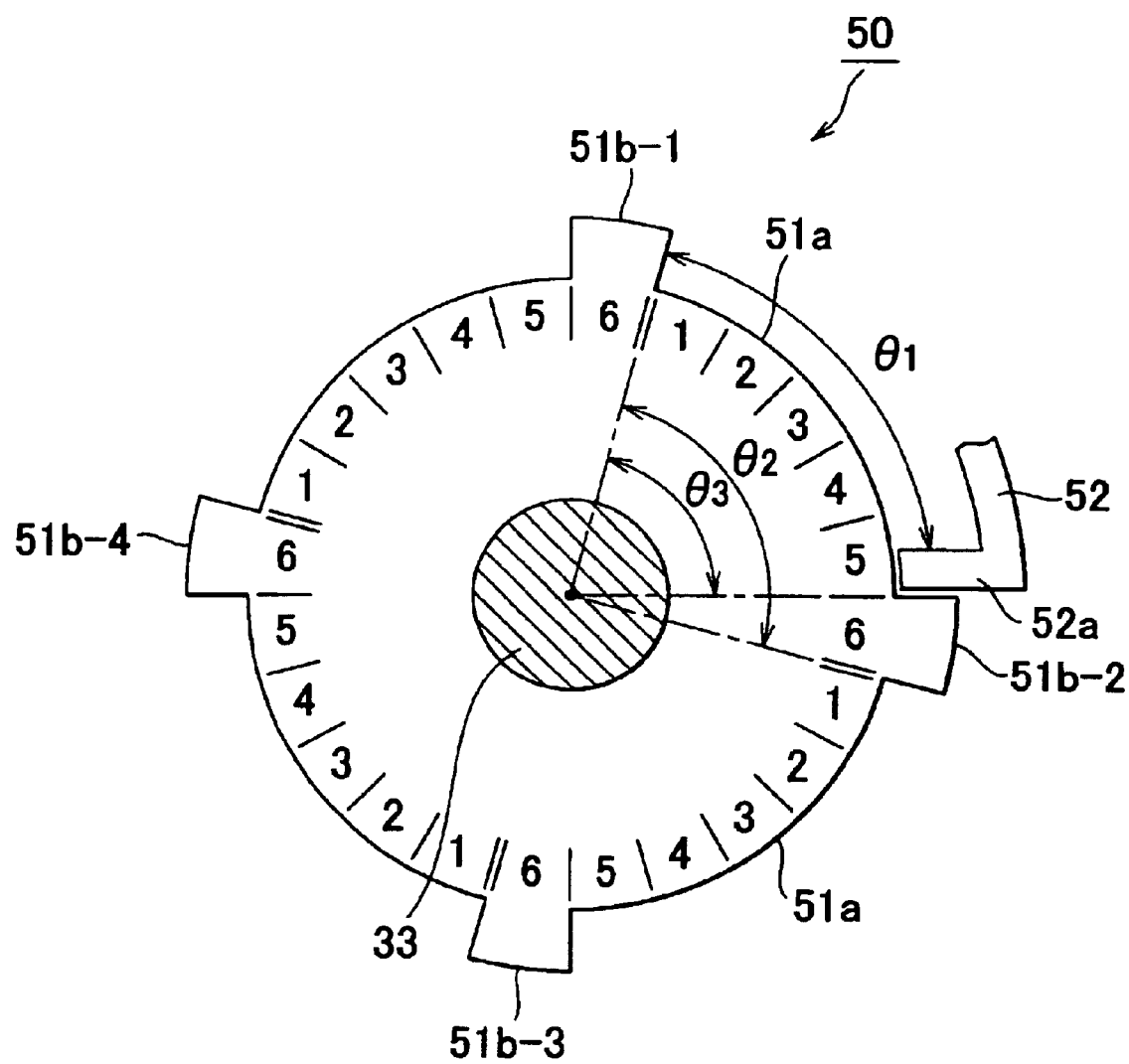
FIG. 5 is an enlarged diagram of the lock mechanism shown in FIG. 2.

For example, the lock arm 52 may be placed at a position corresponding to the output pattern 3 of the detecting portion 26 between the protruding portions 51b-1, 51b-2 when the control finishes as shown in FIG. 5 (an enlarged diagram of the lock mechanism 50), and the output pattern of the detecting portion 26 may be the output pattern 5 when the control starts. In such a case, since the lock arm 52 does not move beyond the protruding portions 51b-1, 51b-2, it can be determined that the lock arm 52 is placed at a position corresponding to the output pattern 5 between the protruding portions 51b-1, 51b-2 when the control starts.

When the control finishes, it can be determined when the engaging portion 52a of the lock arm 52 is to be moved into the indented portion 51a after the protruding portion passes by the engaging portion 52a, by determining beforehand the time required for moving the engaging portion 52a disengaged from the indented portion 51a into the indented portion 51a. In other words, the engaging portion 52a can be prevented from being moved onto the protruding portion, and can be moved into the indented portion 51a. Therefore, it can be determined which of the four indented portions 51a the lock arm 52 is placed in when the control finishes. For example, in the case where the motor 30 rotates in the clockwise direction, and the lock arm 52 is pivoted so as to move into the indented portion 51a when a predetermined time has elapsed after the protruding portion 51b-2 passes by the engaging portion 52a, or when the output pattern becomes the output pattern 5, 4 or 3 after the protruding portion 51b-2 passes by the engaging portion 52a, it can be determined that the lock arm 52 is placed between the protruding portions 51b-1, 51b-2.

As shown in FIG. 5, the opening width, in the circumferential direction, of the indented portion 51a of the lock holder 51 is formed so as to be larger than the width of each of the protruding portions 51b-1 to 51b-4. Preferably, the opening width of the indented portion 51a is formed so as to be equal to or larger than twice the width of each of the protruding portions 51b-1 to 51b-4. The opening width of the indented portion 51a is formed so as to be larger than the width of the engaging portion 52a of the lock arm 52. Thus, the engaging portion 52a of the lock arm 52 is easily inserted in the indented portion 51a. Even when the steering wheel is operated, the lock arm 52 can be reliably engaged with the lock holder 51 such that the lock mechanism 50 is engaged.

Also, a play angle $\theta 1$ between the lock arm 52 and the indented portion 51a when the engaging portion 52a of the lock arm 52 is inserted in the indented portion 51a is set to be smaller than a rotational angle $\theta 2$ of the motor 30 which is required for outputting all of the detection signals in the six different patterns. In FIG. 5, the positions denoted by the reference numerals 1 to 6 at the outer periphery of the lock holder 51 correspond to the output patterns 1 to 6 of the rotation sensor 21, respectively. For example, the rotation sensor 21 outputs the output pattern corresponding to the position at which the lock arm 52 is engaged with the engaging portion 52a.

The play angle $\theta 1$ between the engaging portion 52a of the lock arm 52 and the indented portion 51a is smaller than the angle 90 degrees between two of the protruding portions 51b-1 to 51b-4 adjacent to each other by a thickness of one protruding portion and a thickness of the engaging portion 52a. In FIG. 5, the play angle θ1 is approximately 70 degrees, and the rotational angle θ2 is 90 degrees. In other words, the play angle θ1 is set to be smaller than the rotational angle θ2.

By setting the play angle θ1 in this manner, the rotation sensor 21 can be prevented from outputting the same detection signal at different rotational positions even if the motor 30 rotates due to the play between the lock arm 52 and the indented portion 51a when the lock mechanism 50 is engaged.

For example, since there is play between the lock arm 52 and the indented portion 51a, the motor 30 can rotate with the engaging portion 52a being engaged with the indented portion 51a, which changes the rotational position of the rotating shaft 33. When the vehicle starts thereafter or on other occasions, the output of the rotation sensor 21 changes. However, since the rotation sensor 21 can be prevented from outputting the same detection signal at different rotational positions even if the motor 30 rotates, the rotational position of the rotating shaft 33 can be determined based on the output of the rotation sensor 21. Accordingly, continuity of the control can be maintained and steering can be controlled appropriately at the time of vehicle start or the like.

Preferably, the play angle θ1 is set to be smaller than a rotational angle θ3 of the motor 30 which is required for outputting different detection signals in five output patterns, the number of which is smaller than the aforementioned six output patterns by one.

When the play angle θ1 is set in this manner, even if the lock holder 51 is fitted at an arbitrary rotational position of the rotating shaft 33 of the motor 30, the rotation sensor can be prevented from outputting the same detection signal at different rotational positions of the motor 30 when the lock mechanism 50 is engaged. For example, no matter which rotational position of the rotating shaft 33 the lock holder 51 is fitted at, the rotation sensor 21 is prevented from outputting the same detection signal at different rotational positions while the lock arm 52 is placed in the same indented portion 51a, even if the motor 30 rotates when the lock mechanism 50 is engaged. Therefore, the rotational position of the rotating shaft 33 can be reliably detected based on the output of the rotation sensor 21. As described above, after the lock holder is fitted at an arbitrary position, the data with respect to the positional relation between the lock holder 51 and the lock arm 52 is initialized, and it is determined which of the four indented portions 51a the lock arm 52 is placed in. Thus, since the lock holder 51 can be fitted at an arbitrary position, it becomes easy to fit the lock holder 51 on the rotating shaft 33.

As the play angle θ1 becomes larger, the lock mechanism 50 is engaged more reliably by inserting the lock arm 52 in the indented portion 51a. However, if the play angle θ1 is larger than the rotational angle θ2, the same detection signal is output at different positions in the same indented portion 51a. In this case, since the rotational position of the rotating shaft 33 cannot be accurately detected, continuity of the control cannot be secured. Meanwhile, as the play angle θ1 becomes smaller, the lock mechanism 50 is engaged less reliably by inserting the lock arm 52 in the indented portion 51a. However, as the play angle θ1 becomes smaller, the rotational position of the rotating shaft 33 can be detected more accurately. Therefore, continuity of the control can be secured. According to the aforementioned steering ratio changing device, since the play angle θ1 is smaller than the rotational angle θ2, the lock mechanism 50 can be reliably engaged by inserting the lock arm 52 in the indented portion 51a, and also, the position of the motor can be detected accurately.

As described above, according to the vehicle steering apparatus 1 in the embodiment, the play angle θ1 when the lock mechanism 50 is engaged by inserting the lock arm 52 as the engagement member in the indented portion 51a is set to be smaller than the rotational angle θ2 of the motor 30 which is required for outputting all of a predetermined number of different detection signals. Therefore, the rotation sensor 21 can be prevented from outputting the same detection signal at different rotational positions even if the motor 30 rotates due to the play between the lock arm 52 and the indented portion 51a when the lock mechanism 50 is engaged. Accordingly, the rotational position of the rotating shaft 33 can be reliably detected, which makes it possible to control steering appropriately.

Also, since the order of the detecting portion output patterns is determined as shown in FIG. 4, it can be determined where in the indented portion 51a the lock arm 52 is placed.

Also, the play angle θ1 is smaller than the rotational angle θ3 of the motor 30 which is required for outputting different detection signals, the number of which is smaller than the predetermined number by one. Therefore, even if the lock holder 51 is fitted at an arbitrary rotational position of the rotating shaft 33, the rotation sensor can be prevented from outputting the same detection signal at different rotational positions of the motor 30 when the lock mechanism 50 is engaged. Accordingly, it becomes easy to fit the lock holder 51 on the rotating shaft 33, which improves productivity of the vehicle steering apparatus.

Figure 6:
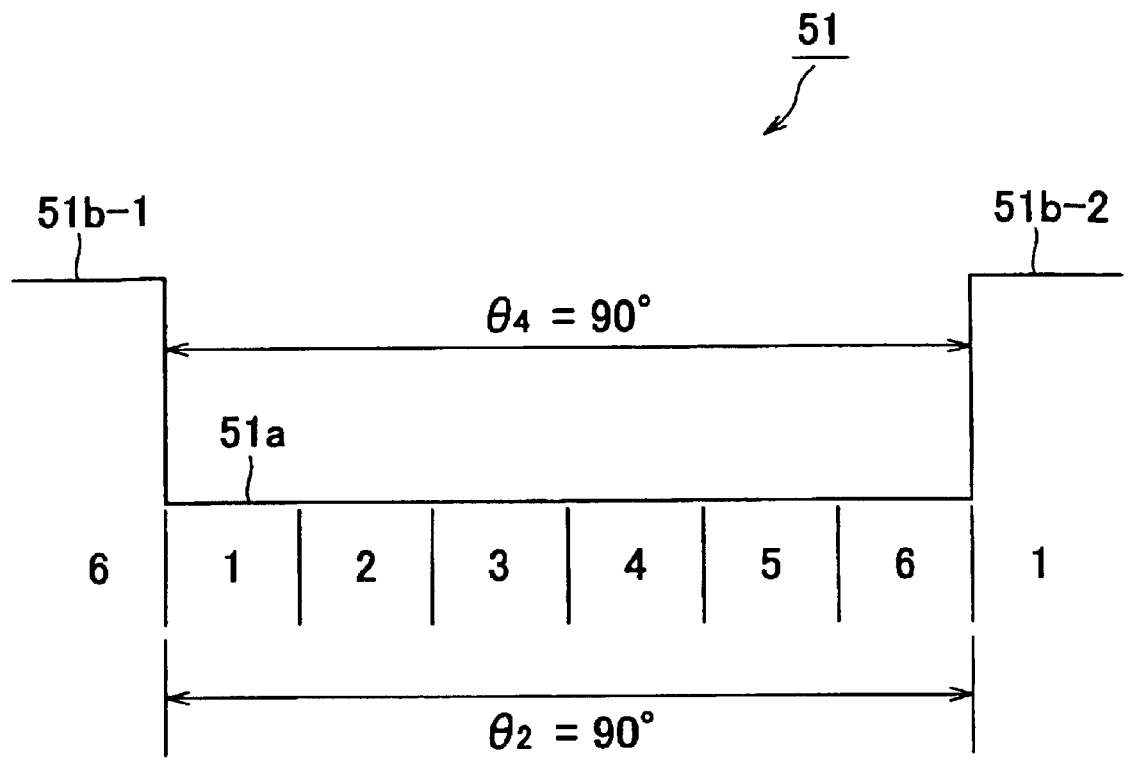
FIG. 6 is a diagram describing an opening angle of a indented portion of a lock holder which is a modified example of the lock holder shown in FIG. 5.
Figure 7:
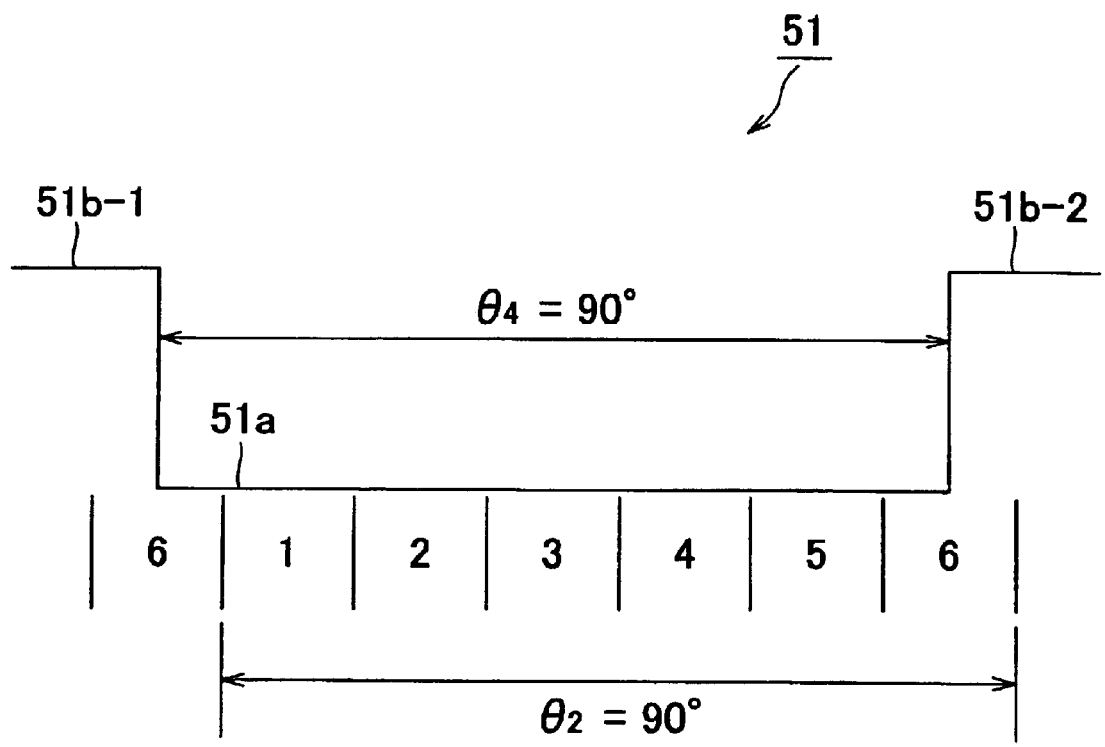
FIG. 7 is a diagram describing an opening angle of a indented portion of the lock holder shown in FIG. 6.
Figure 8:
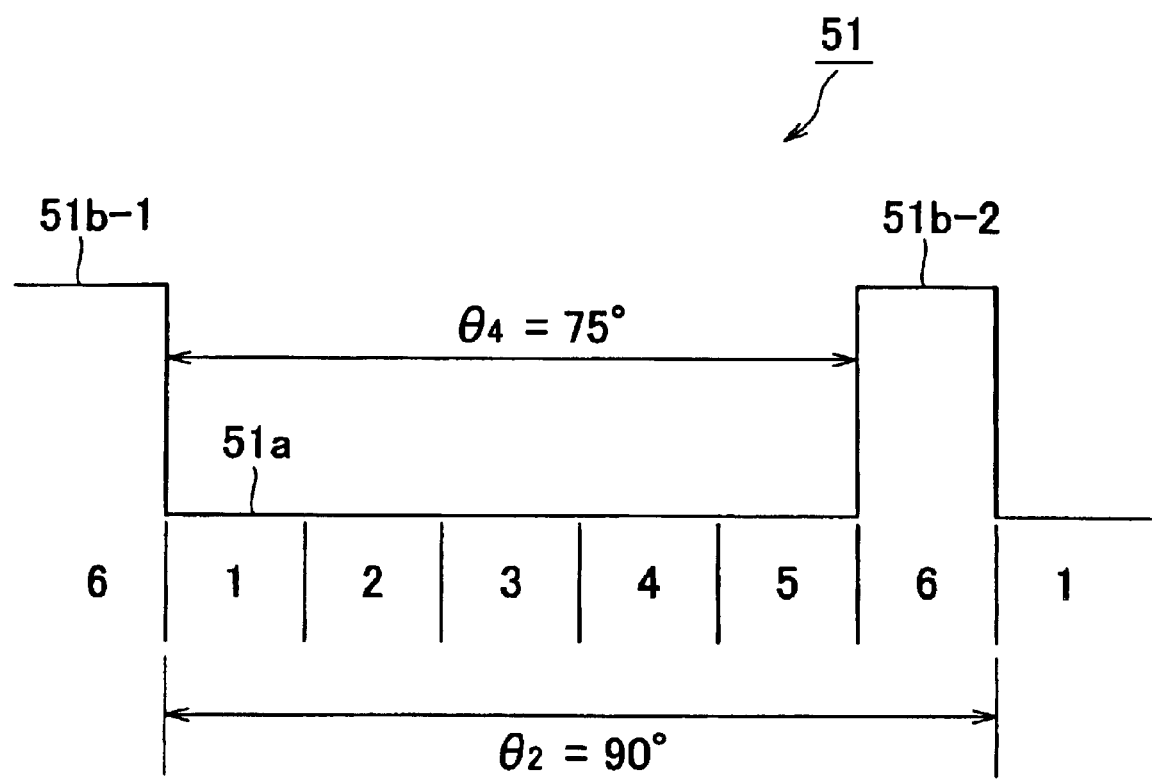
FIG. 8 is a diagram describing an opening angle of a indented portion of the lock holder shown in FIG. 5.

In the embodiment, the rotational angle θ2 of the motor 30 which is required for outputting all of a predetermined number of detection signals is 90 degrees. If an opening angle θ4 of the indented portion 51a of the lock holder 51 is 90 degrees, the lock holder 51 needs to be fitted at a selected position. In other words, as shown in FIG. 6, the lock holder 51 needs to be fitted while aligning the position of the indented portion 51a with the position at which the detecting portion output patterns 1 to 6 are output. In other words, the lock holder 51 needs to be fitted such that the same output pattern is not output twice in the same indented portion 51a. If the lock holder 51 is fitted at an arbitrary position, the same output pattern 6 may be output at both ends of the indented portion 51a, as shown in FIG. 7. In order to prevent occurrence of such a phenomenon, the opening angle θ4 needs to be reduced by an angle equivalent to one output pattern (i.e., 90 degrees/6). Thus, it becomes possible to fit the lock holder 51 at an arbitrary position by setting the opening angle θ4 of the indented portion 51a to be 75 degrees, as shown in FIG. 8.

In the embodiment, there has been described the vehicle steering apparatus including the rotation sensor 21 which repeatedly outputs six different detection signals according to the rotation of the motor 30. However, the invention may be applied to a vehicle steering apparatus including a rotation sensor which repeatedly outputs a predetermined number of different detection signals, the predetermined number being a number other than six. In this case, it is preferable that the vehicle steering apparatus should include a rotation sensor which outputs a predetermined number of different detection signals, the predetermined number being three or more. In this case, the play angle θ1 can be set to be large, the lock mechanism can be reliably engaged.

Also, in the embodiment, basically, the lock holder 51 of the lock mechanism 50 integrally rotates with the rotor portion 25 of the rotation sensor 21. Therefore, the position of the lock arm 52 when the lock arm 52 is inserted in the indented portion 51a can be accurately determined based on the detecting portion output pattern. However, there is a possibility that the position of the lock holder 51 of the lock mechanism 50 will be deviated from the position of the rotor portion 25 of the rotation sensor 21 due to some influence. In this case, it becomes possible again to accurately detect the positional relation between the lock holder 51 and the lock arm 52 by determining the state in which the lock arm 52 is engaged with the indented portion 51a or by determining the order of the detecting portion output patterns in the indented portion 51a. In the embodiment in FIG. 5, the order of the detecting portion output patterns in the indented portion 51a is 1, 2, 3, 4, 5, 6. In this case, it becomes possible again to accurately detect the positional relation between the lock holder 51 and the lock arm 52 by determining that the order of the detecting portion output patterns is, for example, 3, 4, 5, 6, 1, 2.

Also, in the embodiment, the cycle of change in the detecting portion output pattern is 90 degrees. Therefore, the protruding portions 51b-1 to 51b-4 are provided at intervals of 90 degrees. When the cycle of change in the detecting portion output pattern is 120 degrees, the protruding portions are provided at intervals of 120 degrees. When the cycle of change in the detecting portion output pattern is 180 degrees, the protruding portions are provided at intervals of 180 degrees. Also, the protruding portions 51b-1 to 51b-4 has a width that is larger than a width equivalent to the rotational angle (15 degrees in this embodiment) of the motor which is required for outputting each of the detection signals.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A vehicle steering apparatus:
    a variable gear ratio device which includes an input shaft connected to a steering wheel side and an output shaft connected to a turning wheel side, and which changes a ratio between a steering angle input to the input shaft and a rotational angle out put to the output shaft using rotation of a motor;
    a rotation detecting device which repeatedly outputs, as the motor rotates, a series of a predetermined number of different signals, the signals differing according to the rotation of the motor, so as to detect a rotational position of a rotating shaft of the motor; and
    a lock mechanism including a lock holder which rotates together with the rotating shaft of the motor, and in which plural indented portions are formed at an outer periphery portion thereof, and an engagement member which is fitted on a stator side of the motor, the lock mechanism restricting relative rotation of the input shaft and the output shaft by inserting the engagement member in one of the indented portions, wherein a play angle between the engagement member and the indented portion when the engagement member is inserted in the indented portion is smaller than a first rotational angle of the motor which is required for outputting all of the predetermined number of different signals.

2. The vehicle steering apparatus according to claim 1, wherein the play angle is smaller than a second rotational angle of the motor which is required for outputting all of the signals, the number of which is smaller than the predetermined number by one.

3. The vehicle steering appatatus according to claim 1, wherein a third rotational angle of the motor which is required for outputting each of the signals is the same.

4. The vehicle steering apparatus according to claim 3, wherein the third rotational angle is 15 degrees.

5. The vehicle steering apparatus according to claim 1, wherein protruding portions, each of which is formed between the indented portions adjacent to each other, has a width that is equal to or larger than a width equivalent to the third rotational angle.

6. The vehicle steering apparatus according to claim 1, wherein the lock holder and the rotating shaft rotate with respect to each other when torque that is equal to or larger than a predetermined value is applied to the lock holder.

7. The vehicle steering apparatus according to claim 1, wherein the rotation detecting device includes plural magnets which are fitted on the rotating shaft side, and which integrally rotate with the rotating shaft; and plural detectors which are provided along outer peripheries of the plural magnets, and which detect directions of magnetic fields of the plural magnets.

8. The vehicle steering apparatus according to claim 7, wherein the plural detectors are provided in a width of a magnetic pole of one of the magnets in a width direction.

9. The vehicle steering apparatus according to claim 1, wherein the rotation detecting device outputs the series of the predetermined number of different signals a plurality of times while the motor rotates 360 degrees.

10. A vehicle steering apparatus comprising:
    variable gear ratio means for changing a ratio between a steering angle input to an input shaft connected to a steering wheel side and a rotational angle output to an output shaft connected to a turning wheel side using rotation of a motor;
    rotation detecting means for repeatedly outputting, as the motor rotates, a series of a predetermined number of different signals, the signals differing according to the rotation of the motor, so as to detect a rotational position of a rotating shaft of the motor; and
    a lock mechanism including a lock holder which rotates together with the rotating shaft of the motor, and in which plural indented portions are formed at an outer periphery portion thereof, and an engagement member which is fitted on a stator side of the motor, the lock mechanism restricting relative rotation of the input shaft and the output shaft by inserting the engagement member in one of the indented portions, wherein a play angle between the engagement member and the indented portion when the engagement member is inserted in the indented portion is smaller than a first rotational angle of the motor which is required for outputting all of the predetermined number of different signals.

11. The vehicle steering apparatus according to claim 10, wherein the play angle is smaller than a second rotational angle of the motor which is required for outputting all of the signals, the number of which is smaller than the predetermined number by one.

* * * * *